US011601346B2

United States Patent
Wu et al.

(10) Patent No.: US 11,601,346 B2
(45) Date of Patent: Mar. 7, 2023

(54) SERVICE PROVIDING APPARATUS AND METHOD

(71) Applicant: Nippon Telegraph and Telephone Corporation, Tokyo (JP)

(72) Inventors: Chao Wu, Musashino (JP); Kenichi Tayama, Musashino (JP); Shingo Horiuchi, Musashino (JP); Masataka Sato, Musashino (JP); Kenji Murase, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/601,962

(22) PCT Filed: May 13, 2019

(86) PCT No.: PCT/JP2019/018944
§ 371 (c)(1),
(2) Date: Oct. 7, 2021

(87) PCT Pub. No.: WO2020/230236
PCT Pub. Date: Nov. 19, 2020

(65) Prior Publication Data
US 2022/0191110 A1 Jun. 16, 2022

(51) Int. Cl.
*H04L 41/5054* (2022.01)
*H04L 41/0806* (2022.01)
(Continued)

(52) U.S. Cl.
CPC ...... *H04L 41/5054* (2013.01); *H04L 41/0806* (2013.01); *H04L 41/0843* (2013.01); *H04L 41/12* (2013.01); *H04L 41/145* (2013.01)

(58) Field of Classification Search
CPC ....... H04L 41/40; H04L 41/122; H04L 41/12; H04L 41/20; H04L 41/0226
See application file for complete search history.

(56) References Cited

U.S. PATENT DOCUMENTS

2015/0043382 A1* 2/2015 Arora ...................... H04L 41/12
370/254
2016/0127201 A1* 5/2016 Qian .................... H04L 41/5051
709/226

(Continued)

OTHER PUBLICATIONS

ETSI Industry Specification Group, "Network Functions Virtualization (NFV) Release 2; Protocols and Data Models; NFV descriptors based on TOSCA specification," ETSI GS NFV-SOL 001 v.2.5.1, Dec. 2018, retrieved from URL <https://www.etsi.org/deliver/etsi_gs/NFV-SOL/001_099/001/02.05.01_60/gs_NFV-SOL001v020501p.pdf>, 41 pages.

(Continued)

*Primary Examiner* — Joe Chacko
(74) *Attorney, Agent, or Firm* — Fish & Richardson P.C.

(57) ABSTRACT

A service provision method according to one aspect of the present invention includes providing, to a user terminal (107), a catalog including: a first node type for defining a node relating to a VNW (102); a first relationship type for defining a relationship between nodes relating to the VNW (102); a second node type for defining a node relating to an LNW (104); and a second relationship type for defining a relationship between nodes relating to the LNW (104); receiving, from the user terminal (107), a service request generated in accordance with the catalog for requesting a service that uses the HNW (110); and controlling a VNW OpS (103) and an LNW OpS (105) in response to the received service request.

8 Claims, 19 Drawing Sheets

(51) Int. Cl.
*H04L 41/084* (2022.01)
*H04L 41/12* (2022.01)
*H04L 41/14* (2022.01)

(56) References Cited

U.S. PATENT DOCUMENTS

| | | | |
|---|---|---|---|
| 2017/0126435 A1* | 5/2017 | Benny | H04L 45/745 |
| 2017/0201922 A1* | 7/2017 | Akiyoshi | H04W 36/22 |
| 2018/0084459 A1* | 3/2018 | Kamble | H04W 40/02 |
| 2018/0098246 A1* | 4/2018 | Hoffmann | H04W 36/22 |
| 2018/0337931 A1* | 11/2018 | Hermoni | H04L 67/51 |
| 2019/0044799 A1* | 2/2019 | Browne | H04L 41/082 |
| 2019/0097889 A1* | 3/2019 | Browne | H04L 41/0895 |
| 2019/0199597 A1* | 6/2019 | Valisammagari | H04L 41/40 |

OTHER PUBLICATIONS

Oasis Tosca TC, "TOSCA Simple Profile in YAML Version 1.2," OASIS Standard, Jan. 17, 2019, retrieved from URL <https://docs.oasis-open.org/tosca/TOSCA-Simple-Profile-YAML/v1.2/os/TOSCA-Simple-Profile-YAML-v1.2-os.pdf>, 354 pages.

Oasis, "TOSCA Simple Profile for Network Functions Virtualization (NFV) Version 1.0," Committee Specification Draft 04, May 11, 2017, retrieved from URL <http://docs.oasis-open.org/tosca/tosca-nfv/v1.0/csd04/tosca-nfv-v1.0-csd04.pdf>, 16 pages.

* cited by examiner

SERVICE PROVIDING APPARATUS AND METHOD

CROSS-REFERENCE TO RELATED APPLICATIONS

This application is a National Stage application under 35 U.S.C. § 371 of International Application No. PCT/JP2019/018944, having an International Filing Date of May 13, 2019. The disclosure of the prior application is considered part of the disclosure of this application, and is incorporated in its entirety into this application.

TECHNICAL FIELD

An aspect of the present invention relates to a technology of providing a service that uses a hybrid network including a legacy network and a virtual network.

BACKGROUND ART

There is a demand for provision of a service that uses a hybrid network (HNW) including a legacy network (LNW) being a non-virtual network and a virtual network (VNW) in a mixed manner.

A model is defined for each of the legacy network and the virtual network. This causes such a problem in development of a service that uses the hybrid network that representation of the hybrid network by a catalog (CT) is complex, an operation of creating a service request (SR) is complex, and a large number of adaptors between operation support systems (OpSs) are required. For example, in Topology and Orchestration Specification for Cloud Applications (TOSCA), which is a standard specification of Platform as a Service (PaaS), "Node Type" and "Relationship Type" are defined to represent nodes such as network functions of a virtual environment and a relationship between these nodes (refer to Non Patent Literature 1), but TOSCA cannot be applied to a hybrid network including a legacy network.

CITATION LIST

Non Patent Literature

[NPL 1] TOSCA Simple Profile in YAML Version 1.2, OASIS Standard, 17 Jan. 2019, [online], <URL: https://docs.oasis-open.org/tosca/TOSCA-Simple-Profile-YAML/v1.2/os/TOSCA-Simple-Profile-YAML-v1.2-os.pdf>.

SUMMARY OF THE INVENTION

Technical Problem

Against the above-mentioned background, a service that uses the hybrid network is required to be used easily.

The present invention has been made in view of the above-mentioned circumstances, and an object of the present invention is to provide a technology of enabling a service that uses the hybrid network to be used easily.

Means for Solving the Problem

In a first aspect of the present invention, a service provision method includes: providing a catalog including: a first node type for defining anode relating to a virtual network; a first relationship type for defining a relationship between nodes relating to the virtual network; a second node type for defining a node relating to a legacy network; and a second relationship type for defining a relationship between nodes relating to the legacy network; receiving, from a user terminal, a service request generated in accordance with the catalog for requesting a service that uses a hybrid network including the virtual network and the legacy network; and controlling a virtual network operation support system that manages the virtual network and a legacy network operation support system that manages the legacy network in response to the received service request.

In a second aspect of the present invention, the second node type may include a node type for defining a link or a device having a forwarding function relating to the legacy network and a node type for defining a termination point of a port or a link relating to the legacy network.

In a third aspect of the present invention, the second relationship type may include a relationship type for defining an intra-layer relationship between nodes relating to the legacy network and a relationship type for defining an inter-layer relationship between nodes relating to the legacy network.

In a fourth aspect of the present invention, the first node type and the first relationship type are a node type and a relationship type, which are defined in TOSCA.

In a fifth aspect of the present invention, the hybrid network may include a plurality of legacy networks, and the second node type and the second relationship type may be designed so as to be capable of being applied to the plurality of legacy networks.

Effects of the Invention

According to the first aspect of the present invention, the number of catalogs to be referred to and the number of service requests to be generated are reduced compared to the case of preparing a catalog for each network. As a result, it is easy to apply for the service. Furthermore, the hybrid network orchestrator can control the virtual network operation support system and the legacy network operation support system in an integrated manner. As a result, an adaptor between service operation systems is not required, and it is easy to implement the service provision system.

According to the second aspect of the present invention, it is possible to represent a node relating to the legacy network by any one of two types of node types. As a result, it is easy to perform operation of creating a service request.

According to the third aspect of the present invention, it is possible to represent a relationship between nodes relating to the legacy network by any one of two types of relationship types. As a result, it is easy to perform operation of creating a service request.

According to the fourth aspect of the present invention, TOSCA being a known model is used. As a result, it is easy to create a catalog.

According to the fifth aspect of the present invention, an adaptor between operation support systems of respective legacy networks is not required, and it is easy to implement the service provision system.

In summary, according to each aspect of the present invention, it is possible to provide a technology of enabling the service that uses the hybrid network to be used easily.

DESCRIPTION OF EMBODIMENTS

Now, description is given of one embodiment of the present invention with reference to the drawings.

[Configuration]

Figure 1:
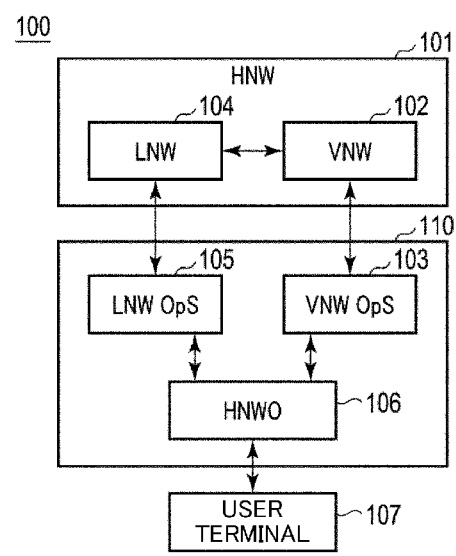
FIG. 1 is a block diagram illustrating an example of a service provision system according to one embodiment.

FIG. 1 illustrates a schematic example of a service provision system 100 according to one embodiment. In the example illustrated in FIG. 1, the service provision system 100 includes a hybrid network (HNW) 101 and a service provision unit 110. The service provision unit 110 provides a user terminal 107 with a service that uses a hybrid network 101. An example of the service includes, for example, PaaS being a service that provides a user with a platform that enables development, execution, and management of an application. The user terminal 107 is a computer such as a smartphone or a personal computer (PC), which is associated with the user.

The hybrid network 101 includes a virtual network (VNW) 102 and a legacy network (LNW) 104. The legacy network is also referred to as "non-virtual network". The virtual network 102 and the legacy network 104 may communicate with each other via a communication network that may include the Internet.

The service provision unit 110 includes a virtual network operation support system (VNW OpS) 103, a legacy network operation support system (LNW OpS) 105, and a hybrid network orchestrator (HNWO) 106. The virtual network operation support system is also referred to as "virtual network orchestrator (VNWO)". The hybrid network orchestrator 106 corresponds to a service provision device.

The virtual network operation support system 103 manages or controls the virtual network 102. The legacy network operation support system 105 manages or controls the legacy network 104. The hybrid network orchestrator 106 manages or controls the hybrid network 101. Specifically, the hybrid network orchestrator 106 controls the virtual network operation support system 103 to manage the virtual network 102, and controls the legacy network operation support system 105 to manage the legacy network 104. The virtual network operation support system 103 executes, for the virtual network 102, processing that depends on an instruction from the hybrid network orchestrator 106. The legacy network operation support system 105 executes, for the legacy network 104, processing that depends on an instruction from the hybrid network orchestrator 106.

The hybrid network orchestrator 106 provides a service catalog including a node type for defining a node relating to the virtual network 102, a relationship type for defining a relationship between nodes relating to the virtual network 102, a node type for defining a node relating to the legacy network 104, and a relationship type for defining a relationship between nodes relating to the legacy network 104. The service catalog is also simply referred to as "catalog". The hybrid network orchestrator 106 receives, from the user terminal 107, a service request for requesting a service that uses the hybrid network 101. The service request is generated in accordance with the service catalog. The hybrid network orchestrator 106 controls the virtual network operation support system 103 and the legacy network operation support system 105 in response to the received service request. In this manner, the hybrid network orchestrator 106 provides a service to the user terminal 107.

Each of the virtual network operation support system 103, the legacy network operation support system 105, and the hybrid network orchestrator 106 is implemented on a computer such as a server. For example, the computer includes a central processing unit (CPU) and a memory storing a program, and the CPU executes the program to function as the virtual network operation support system 103, the legacy network operation support system 105, or the hybrid network orchestrator 106. Each of the virtual network operation support system 103, the legacy network operation support system 105, and the hybrid network orchestrator 106 may be implemented by a plurality of computers. The service catalog may be stored in the memory in the computer in which the hybrid network orchestrator 106 is implemented, or may be stored in another computer that can be accessed by the computer in which the hybrid network orchestrator 106 is implemented.

Figure 2:
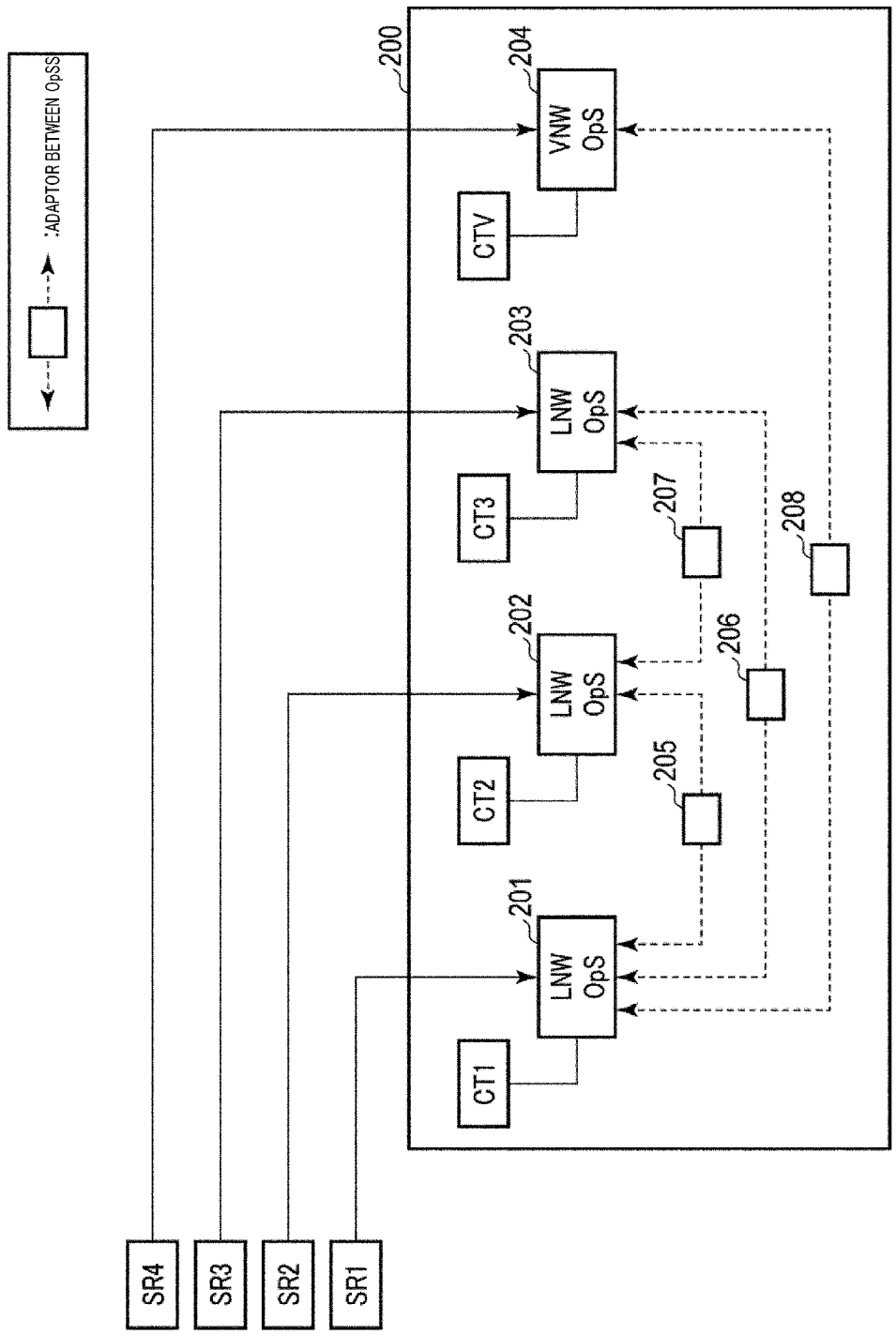
FIG. 2 is a block diagram illustrating an example of a service provision system according to a related technology.

FIG. 2 illustrates a schematic example of a service provision system according to a related technology. The service provision system illustrated in FIG. 2 includes a hybrid network (not shown) and a service provision unit 200. The service provision unit 200 provides a service that uses the hybrid network, and includes legacy network operation support systems 201, 202, and 203, and a virtual network operation support system 204. The legacy network operation support systems 201, 202, and 203 manage each legacy network included in the hybrid network. The virtual network operation support system 204 manages a virtual network included in the hybrid network.

A model is defined for each of the legacy network and the virtual network in the service provision system illustrated in FIG. 2. TOSCA established by Organization for the Advancement of Structured Information Standards (OASIS) can be used as a model for the virtual network, for example. In this manner, a catalog that corresponds to each network is prepared. In FIG. 2, the legacy network operation support systems 201, 202, and 203 have catalogs CT1, CT2, and CT3, respectively, and the virtual network operation support system 204 has a catalog CTV.

When a model is defined for each of the legacy network and the virtual network, there are three issues given below to provide a service that uses the hybrid network.

Issue 1: Representation of the hybrid network by a catalog is complex. For example, a large number of catalogs are required to be referred to at the time of application of the service.

Issue 2: Operation of creating a service request is complex. For example, the service requests SR1, SR2, SR3, and SR4 are required to be created in accordance with respective models (respective catalogs CT1, CT2, CT3, and CTV) of the legacy network at the time of application of the service. Thus, the cost of creating a service request is high.

Issue 3: A large number of adaptors between operation support systems are required at the time of implementation of the hybrid network. The adaptor is provided for exchange of information between operation support systems. In the example illustrated in FIG. 2, an adaptor 205 is provided between the legacy network operation support systems 201 and 202, an adaptor 206 is provided between the legacy network operation support systems 201 and 203, an adaptor 207 is provided between the legacy network operation support systems 202 and 203, and an adaptor 208 is provided between the legacy network operation support system 201 and the virtual network operation support system 204.

Figure 3:
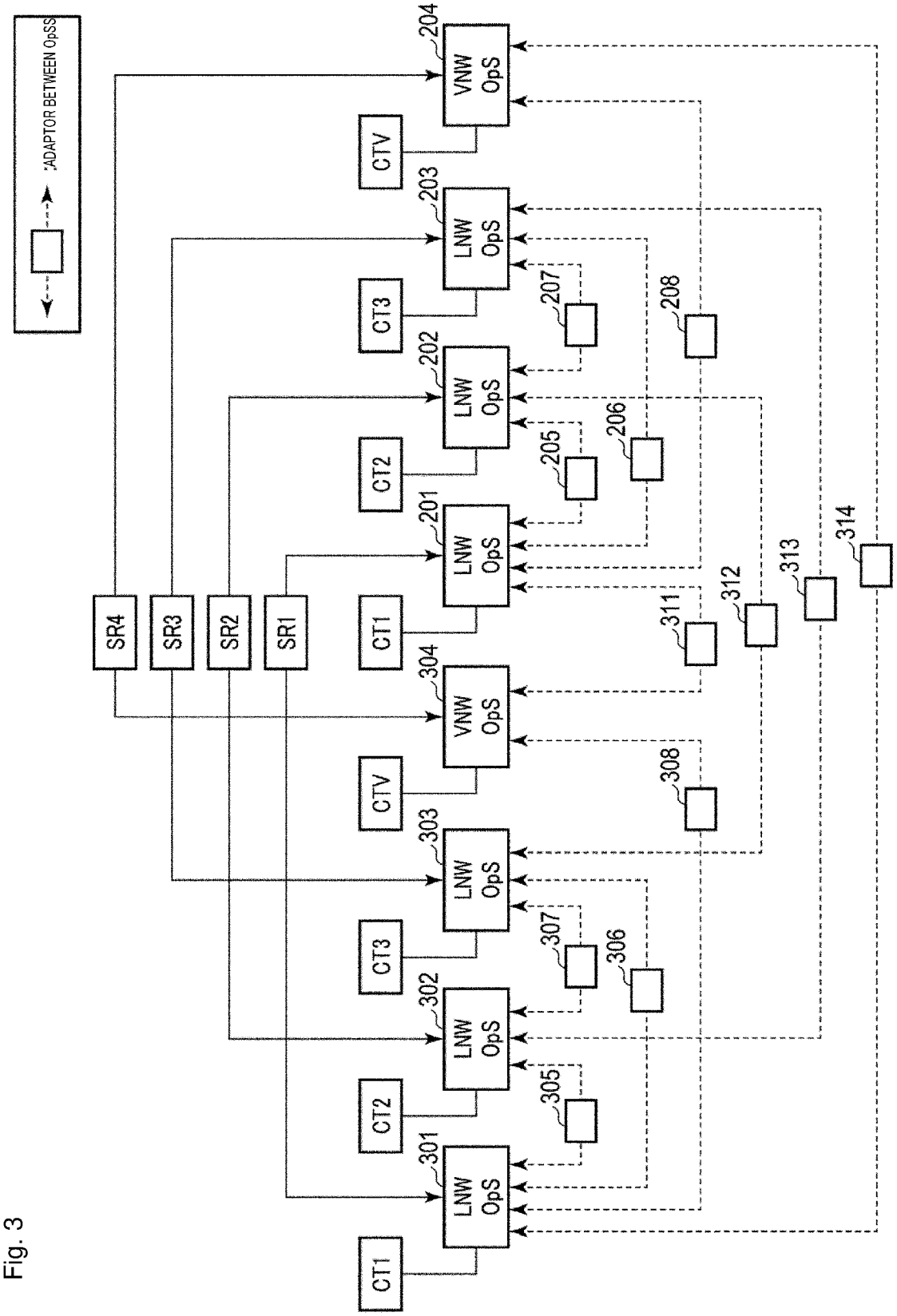
FIG. 3 is a block diagram illustrating another example of the service provision system according to the related technology.

When a service is provided across hybrid networks of a plurality of communication carriers, the situation becomes more complex. FIG. 3 illustrates a schematic example of a service provision system including hybrid networks of two communication carriers according to a related technology. In FIG. 3, the same component as that illustrated in FIG. 2 is assigned with the same reference symbol, and description thereof is omitted here. In the example illustrated in FIG. 3, the legacy network operation support systems 201, 202, and 203 and the virtual network operation support system 204 correspond to a first communication carrier, and legacy network operation support systems 301, 302, and 303, and a virtual network operation support system 304 correspond to a second communication carrier.

The legacy network operation support systems 301, 302, and 303 have the catalogs CT1, CT2, CT3, respectively, and the virtual network operation support system 304 has the catalog CTV. In addition to the adaptors 205 to 208, an adaptor 305 is provided between the legacy network operation support systems 301 and 302, an adaptor 306 is provided between the legacy network operation support systems 301 and 303, an adaptor 307 is provided between the legacy network operation support systems 302 and 303, an adaptor 308 is provided between the legacy network operation support system 301 and the virtual network operation support system 304, an adaptor 311 is provided between the legacy network operation support system 201 and the virtual network operation support system 304, an adaptor 312 is provided between the legacy network operation support systems 202 and 303, an adaptor 313 is provided between the legacy network operation support systems 203 and 302, and an adaptor 314 is provided between the virtual network operation support system 204 and the legacy network operation support system 301.

In the service provision system illustrated in FIG. 3, the number of service requests required for applying for a service and the number of types of catalogs increase further compared to the service provision system illustrated in FIG. 2. The cost also increases along with this increase. Furthermore, the number of required adaptors also increases.

One solution to the above-mentioned issues is to extend a known model applicable only to the virtual network such that the model can be applied to the hybrid network. In the following description, TOSCA is assumed as the known model applicable only to the virtual network.

First, description is briefly given of TOSCA with reference to FIG. 4 to FIG. 10.

Figure 4:
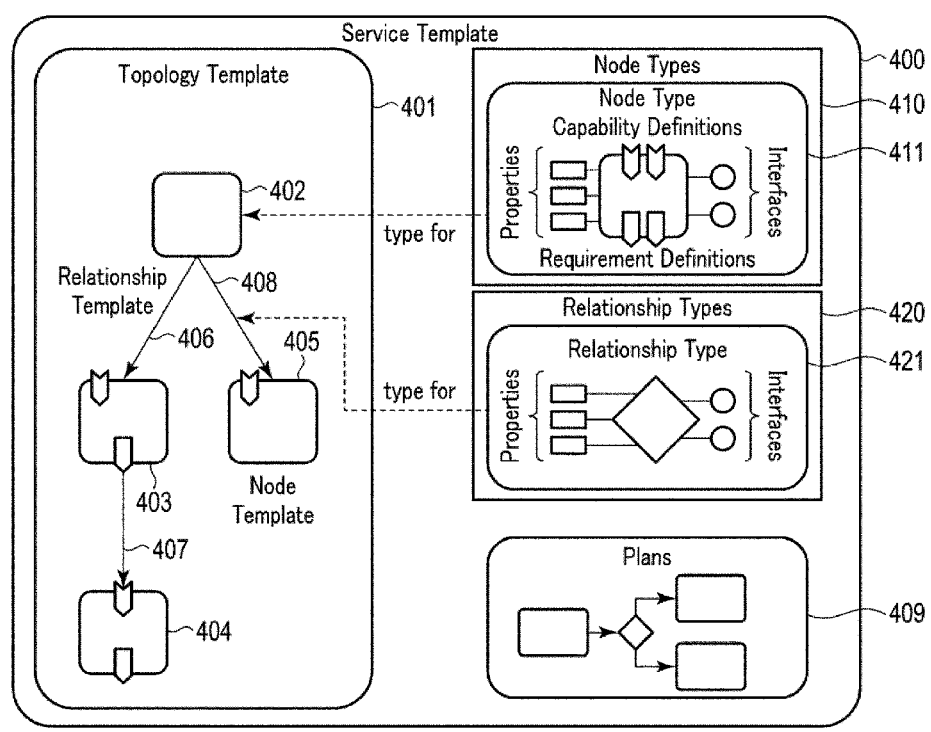
FIG. 4 is a diagram illustrating TOSCA.

As illustrated in FIG. 4, TOSCA provides a Service Template 400, which is a pattern of an application, in order to generate a cloud application. The Service Template 400 includes a Topology Template 401 and Plans 409. The Topology Template 401 describes structure of an application by combining Node Templates 402 to 405 for defining a node (e.g., web server or database server) such as a network function of the virtual environment with Relationship Templates 406 to 408 for defining a relationship between nodes. The deployment procedure, management procedure, and other information of the Service Template 400 are described as the Plans 409.

Figure 5:
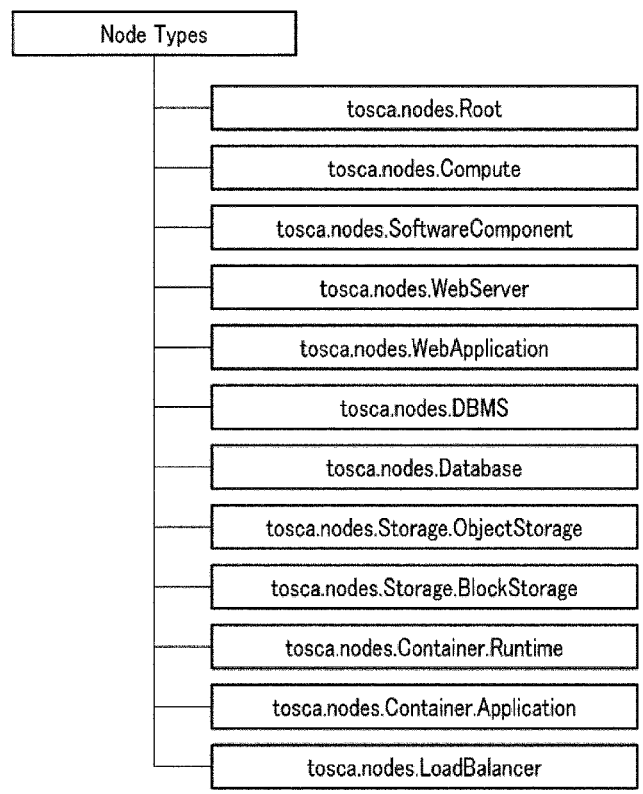
FIG. 5 is a diagram illustrating TOSCA.

Each Node Template is created in accordance with a Node Type selected from among the Node Types 410 prepared in advance. For example, the Node Template 402 is created by using a Node Type 411 among the Node Types 410. In TOSCA, as illustrated in FIG. 5, Root (tosca.nodes.Root), Compute (tosca.nodes.Compute), SoftwareComponent (tosca.nodes.SoftwareComponent), WebServer(tosca.nodes.WebServer), WebApplication(tosca.nodes.WebApplication), DBMS (tosca.nodes.DBMS), Database (tosca.nodes.Database), ObjectStorage (tosca.nodes.Storage.ObjectStorage), BlockStorage (tosca.nodes.Storage.BlockStorage), Runtime (tosca.nodes.Container.Runtime), Application (tosca.nodes.Container.Application), LoadBalancer (tosca.nodes.LoadBalancer) are prepared as the Node Types 410. A Node Type that depends on the type of a node is selected. For example, when the node is a web server, WebServer is used.

The Node Type defines semantics of a node, such as a property, an interface, a function, and a request. The property represents a configuration or state of a node. For example, when the node is an application server, the property includes a host name, an Internet Protocol (IP) address, and a port number, for example. For example, a set of operations for controlling the node are defined as the interface. For example, when the node is a web server, an example of the command includes install, uninstall, configure, start, and stop. The function represents a function that can be provided to a partner (another node). The request represents a function that is a requirement given to a partner.

Figure 6:
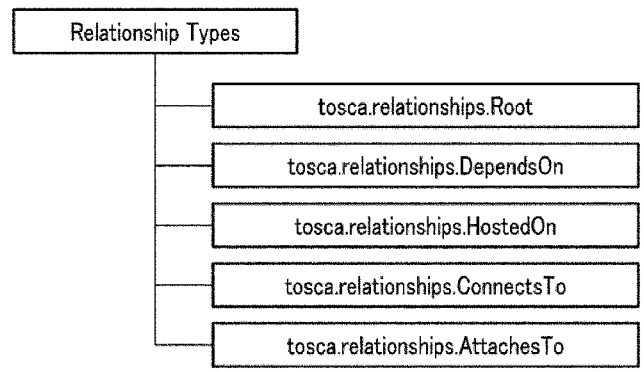
FIG. 6 is a diagram illustrating TOSCA.

Each Relationship Template is created in accordance with a Relationship Type selected from among the Relationship Types 420 prepared in advance. In FIG. 4, for example, the Relationship Template 408 between the Node Template 402 and the Node Template 405 is created by using a Relationship Type 421. In TOSCA, as illustrated in FIG. 6, Root (tosca.relationships.Root), DependsOn (tosca.relationships.DependsOn), HostedOn (tosca.relationships.HostedOn), ConnectsTo (tosca.relationships.ConnectsTo), and AttachesTo (tosca.relationships.AttachesTo) are prepared as the Relationship Types 420. A Relationship Type that depends on a relationship between two nodes is selected. For example, HostedOn is used in the case of an accommodation relationship.

Figure 7:
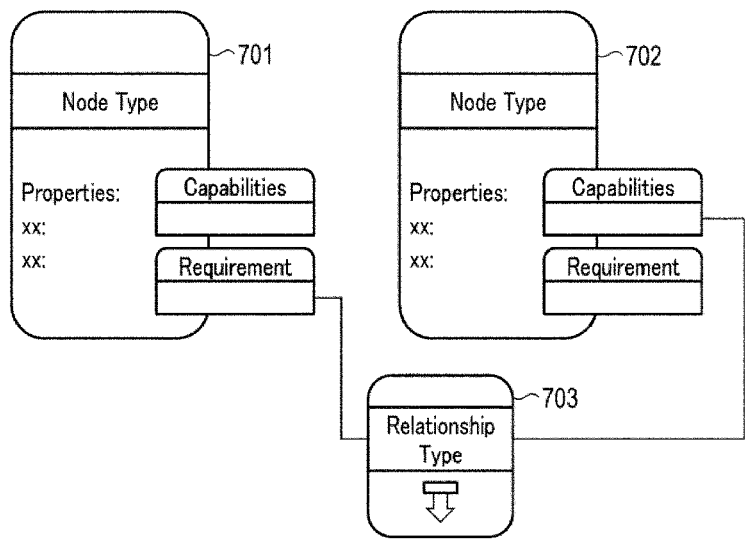
FIG. 7 is a diagram illustrating TOSCA.

A relationship between Node Templates can be represented by Relationship Template, Requirement of one Node Template, and Capabilities of the other Node Template. For example, as illustrated in FIG. 7, a relationship between the Node Template 701 and the Node Template 702 is represented by the Relationship Template 703, Requirement of the Node Template 701, and Capabilities of the Node Template 702.

Figure 8:
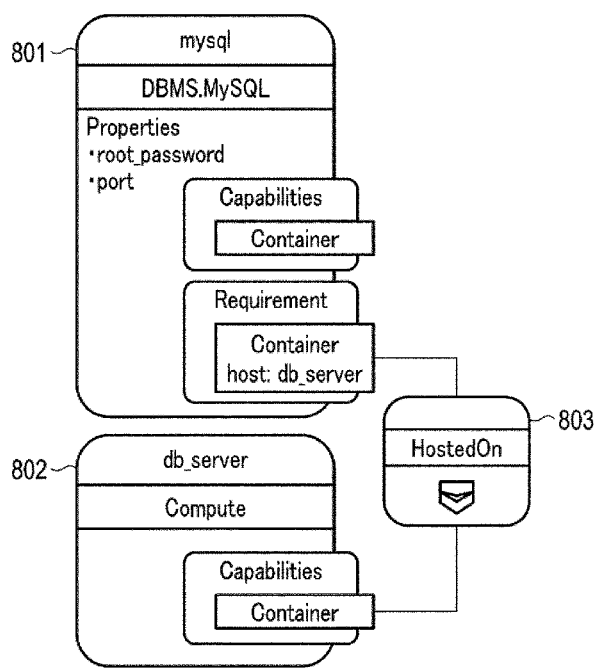
FIG. 8 is a diagram illustrating TOSCA.

Now, description is given of an example of representing a vertical relationship between nodes in TOSCA with reference to FIG. 8. FIG. 8 illustrates an example of representing the fact that an application (mysql) is accommodated in a container (db_server) by Relation Type "HostedOn". In the example illustrated in FIG. 8, the Node Template 801 corresponding to mysql requires a container, and the Node Template 802 corresponding to db_server provides a container. The Relationship Template 803 between the Node Template 801 and the Node Template 802 is created by using HostedOn.

Figure 9:
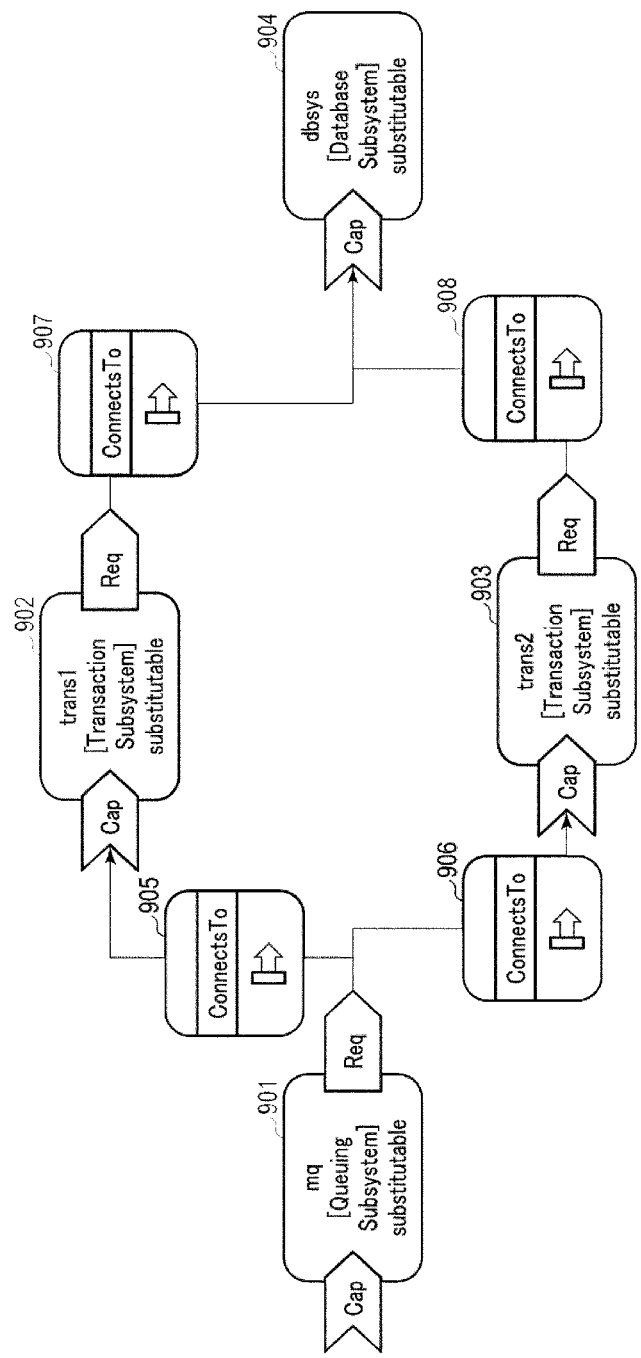
FIG. 9 is a diagram illustrating TOSCA.
Figure 10:
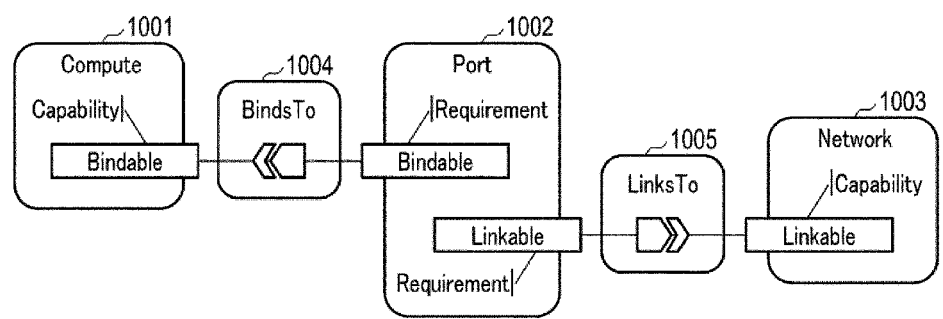
FIG. 10 is a diagram illustrating TOSCA.

Now, description is given of an example of representing a horizontal relationship between nodes in TOSCA with reference to FIG. 9 and FIG. 10. FIG. 9 illustrates an example of representing the fact that a queuing subsystem is connected to a transaction subsystem, and a transaction subsystem is connected to a database subsystem by Relationship Type "ConnectsTo". As illustrated in FIG. 9, Relationship Templates 905 and 906 between a Node Template 901 corresponding to the queuing subsystem and Node Templates 902 and 903 corresponding to the transaction subsystem, and Relationship Templates 907 and 908 between the Node Templates 902 and 903 and a Node Template 904 corresponding to the database subsystem are created by using ConnectsTo.

FIG. 10 illustrates an example of representing the fact that a port is associated with a computer function by Relationship Type "BindsTo", and the fact that a port is associated with a network by Relationship Type "LinksTo". As illustrated in FIG. 10, a Relationship Template 1004 between a Node Template 1001 corresponding to the computer function and a Node Template 1002 corresponding to the port is created by using BindsTo, and a Relationship Template 1005 between the Node Template 1002 and a Node Template 1003 corresponding to the network is created by using LinksTo.

Figure 11:
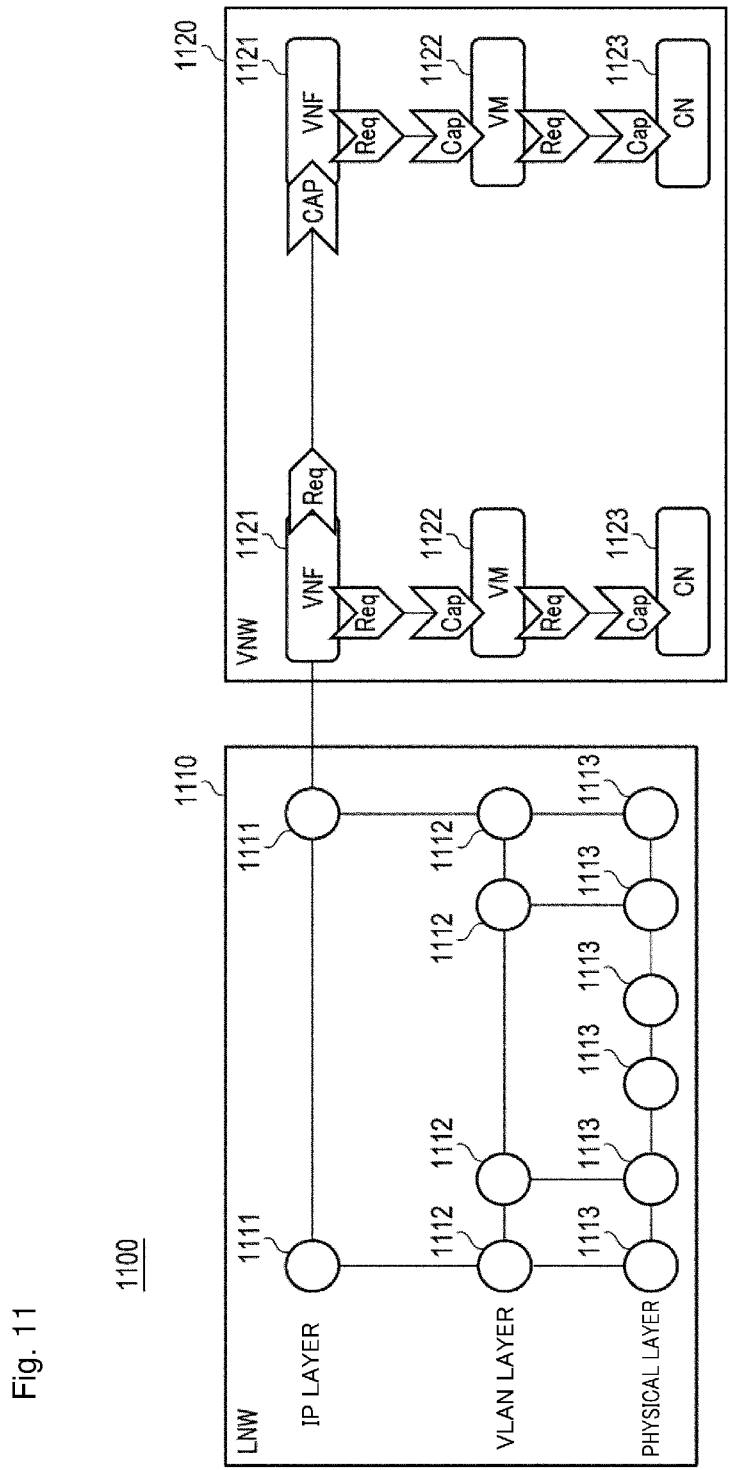
FIG. 11 is a block diagram illustrating an exemplary configuration of a hybrid network according to one embodiment.

The above-mentioned TOSCA can be applied to a virtual network, but cannot be applied to a hybrid network including a legacy network as illustrated in FIG. 11. A hybrid network 1100 illustrated in FIG. 11 is a non-restrictive example of the hybrid network 101 illustrated in FIG. 1. As illustrated in FIG. 11, the hybrid network 1100 includes a legacy network 1110 and a virtual network 1120. The legacy network 1110 includes a node 1111 belonging to an IP layer, a node 1112 belonging to a virtual local area network layer (VLAN), and a node (e.g., physical router) 1113 belonging to a physical (PHY) layer. The virtual network 1120 has a virtual network function (VNF), a virtual machine (VN), and a computer node (CN).

A model applicable to the hybrid network may be generated by extending TOSCA, for example. Extension of TOSCA may be achieved by adding, to TOSCA, a method of representing a node relating to the legacy network and a method of representing a vertical and horizontal relationship between nodes relating to the legacy network.

Figure 12:
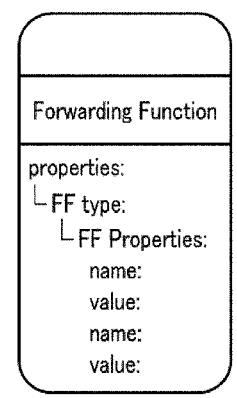
FIG. 12 is a diagram illustrating an example of Node Type for defining a link or a device relating to a legacy network according to one embodiment.

In one embodiment, two types of Node Types, namely, an FF Node and a TP Node are added to TOSCA. As illustrated in FIG. 12, the FF Node is a Node Type for defining a link or a device having a forwarding function (FF) relating to the legacy network. The link or a device having a forwarding function is also referred to as "forwarding function node". The FF Node is designed such that the property is not dedicated to the network. In other words, the FF Node is designed so as to be applicable to a plurality of any networks. The FF Node defines, for example, the type of FF, the property of FF, the name of the FF property, and the value of the FF property. When Node Template is generated depending on the network, FF Type and FF properties can be specified depending on a specific type of the network. Thus, the FF Node can represent a forwarding function node in various legacy networks.

Figure 13:
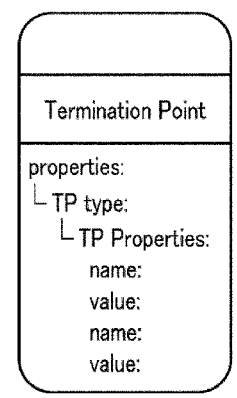
FIG. 13 is a diagram illustrating an example of Node Type for defining a termination point of a port or a link relating to the legacy network according to one embodiment.

As illustrated in FIG. 13, the TP Node is a Node Type for defining a termination point (TP) of a port or a link relating to the legacy network. The termination point of a port or a link is also referred to as "termination point node". Similarly to the FF Node, the TP Node is designed such that the property is not dedicated to the network. In other words, the TP Node is designed so as to be applicable to a plurality of any legacy networks. The TP Node defines, for example, the type of TP, the property of TP, the name of the TP property, and the value of the TP property. TP Type and TP properties can be specified depending on a specific type of the network. Thus, the TP Node can represent a termination point node in various legacy networks.

The above-mentioned FF Node and TP Node enable representation of various kinds of legacy networks in an integrated manner. In other words, the Node Type is not required to be prepared for each legacy network.

Figure 14:
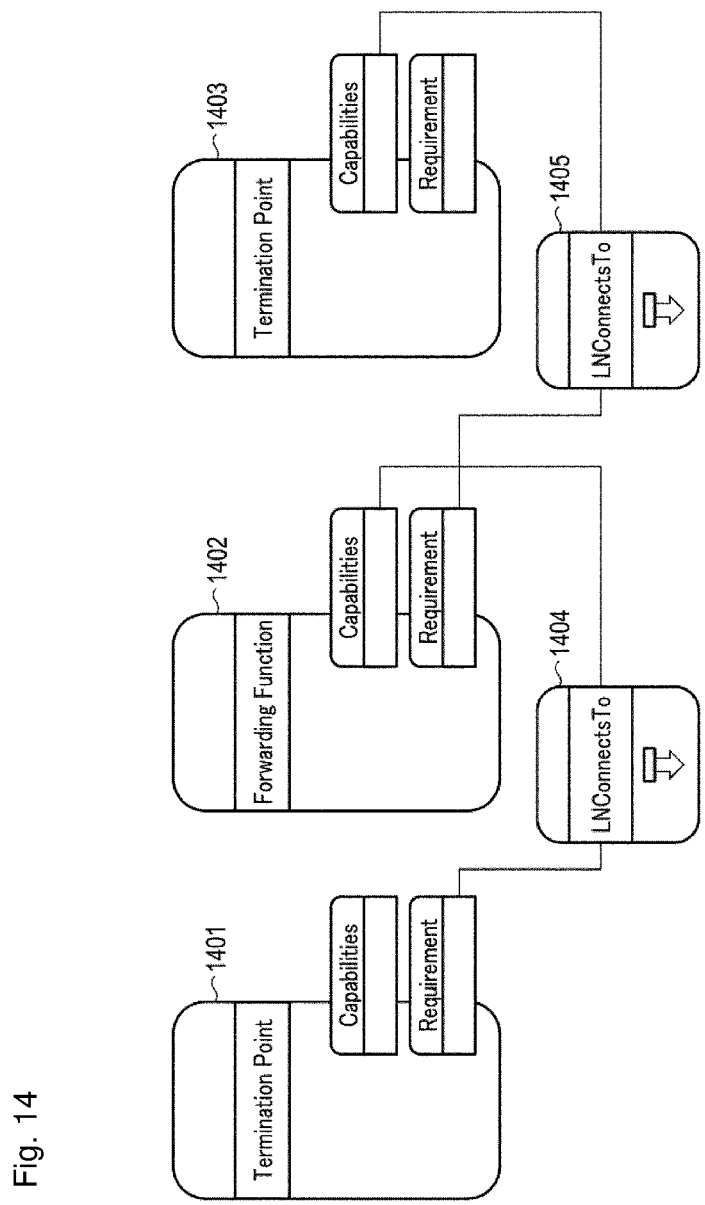
FIG. 14 is a diagram illustrating an example of Relationship Type for defining an intra-layer relationship between nodes relating to the legacy network according to one embodiment.

In one embodiment, two types of Relationship Types, namely, LNconnectsTo and LNCapability ProvidedBy are added to TOSCA. LNconnectsTo is a Relationship Type for defining an intra-layer relationship (horizontal relationship) between nodes relating to the legacy network. The intra-layer relationship between nodes indicates a relationship between nodes belonging to the same layer (e.g., VLAN layer). In contrast to the virtual network, in the legacy network, an FF Node is always connected to a TP Node as illustrated in FIG. 14. In other words, an FF Node and an FF Node cannot be directly connected to each other, and a TP Node and a TP Node cannot be directly connected to each other. Thus, in the legacy network, not ConnectsTo for the virtual network but LNconnectsTo is used. LNconnectsTo connects an FF Node and a TP Node to each other. In the example illustrated in FIG. 14, a Relationship Template 1404 between a Node Template 1401 corresponding to the TP Node and a Node Template 1402 corresponding to the FF Node, and a Relationship Template 1405 between the Node Template 1402 and a Node Template 1403 corresponding to the TP Node are created by LNconnectsTo.

The LNCapability ProvidedBy is a Relationship Type for defining an inter-layer relationship (vertical relationship) between nodes relating to the legacy network. The inter-layer relationship between nodes indicates a relationship between nodes belonging to different layers (e.g., IP layer and VLAN layer). The inter-layer relationship may be a one-to-one relationship or a one-to-many relationship. FIG.

Figure 15:
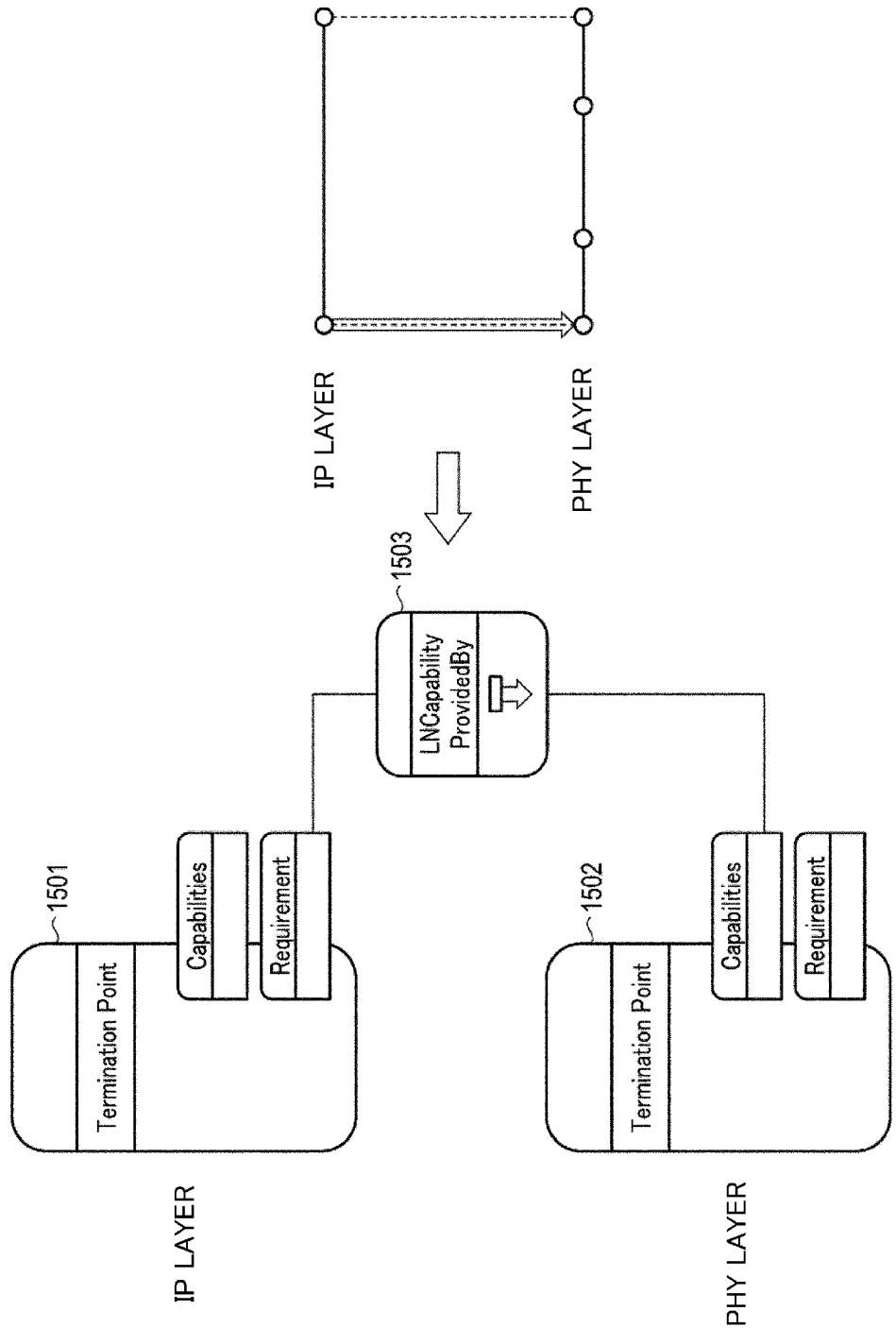
FIG. 15 is a diagram illustrating an example of Relationship Type for defining an inter-layer relationship between nodes relating to the legacy network according to one embodiment.
Figure 16:
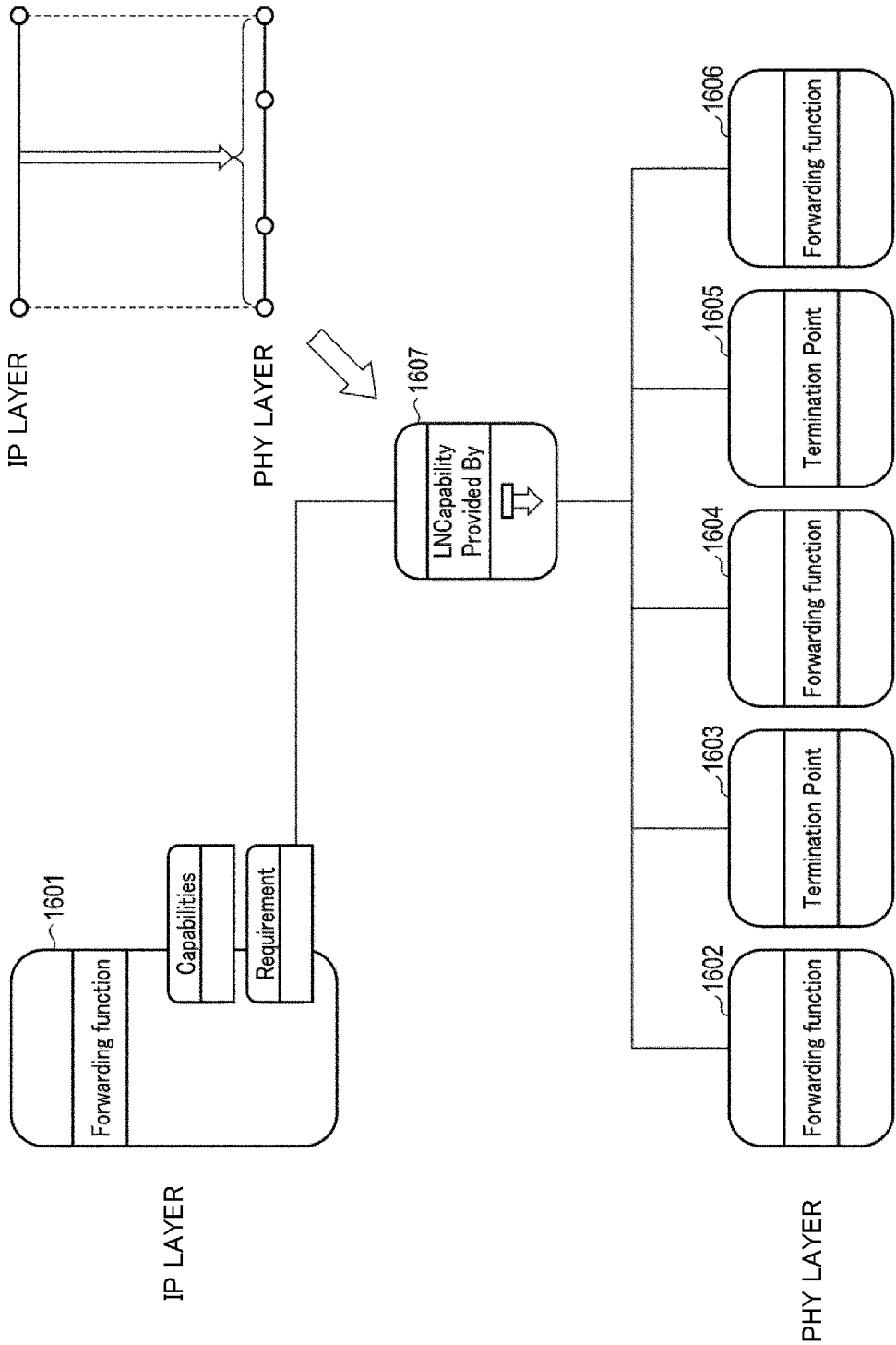
FIG. 16 is a diagram illustrating an example of Relationship Type for defining an inter-layer relationship between nodes relating to the legacy network according to one embodiment.

15 illustrates an example of representing, by LNCapability ProvidedBy, the fact that a termination point node (e.g., IP port) of the IP layer is accommodated in a termination point node (e.g., port of physical layer) of the PHY layer being a layer lower than the IP layer. In the example illustrated in FIG. 15, a Relationship Template 1503 between a Node Template 1501 corresponding to a termination point node of the IP layer and a Node Template 1502 corresponding to a termination point node of the PHY layer is created by LNCapability ProvidedBy. In the right part of FIG. 15, the solid line indicates a forwarding function node, the while circle indicates a termination point node, and the arrow connecting the termination point node of the IP layer and the termination point node of the PHY layer to each other indicates an inter-layer relationship corresponding to LNCapability ProvidedBy. FIG. 16 illustrates an example of representing, by LNCapability ProvidedBy, the fact that a forwarding function node (e.g., link) of the IP layer is accommodated in a forwarding function node and a termination point node (e.g., physical router and line) of the PHY layer. In the example illustrated in FIG. 16, a Relationship Template 1607 among a Node Template 1601 corresponding to the forwarding function node of the IP layer, Node Templates 1602, 1604, and 1606 corresponding to the forwarding function node of the PHY layer, and Node Templates 1603 and 1605 corresponding to the termination point node of the PHY layer is created by LNCapability ProvidedBy. In the right part of FIG. 16, the solid line indicates an FF node, the while circle indicates a TP node, and the arrow connecting the forwarding function node of the IP layer, and the forwarding function node and the termination point node of the PHY layer to one another indicates an inter-layer relationship corresponding to LNCapability ProvidedBy 1607.

A model, which is obtained by adding to a model (e.g., TOSCA) the above-mentioned two types of Node Types (FF Node and TP Node) and two types of Relationship Types (LNconnectsTo and LNCapability ProvidedBy), is referred to as "extended model" or "integrated model".

Figure 17:
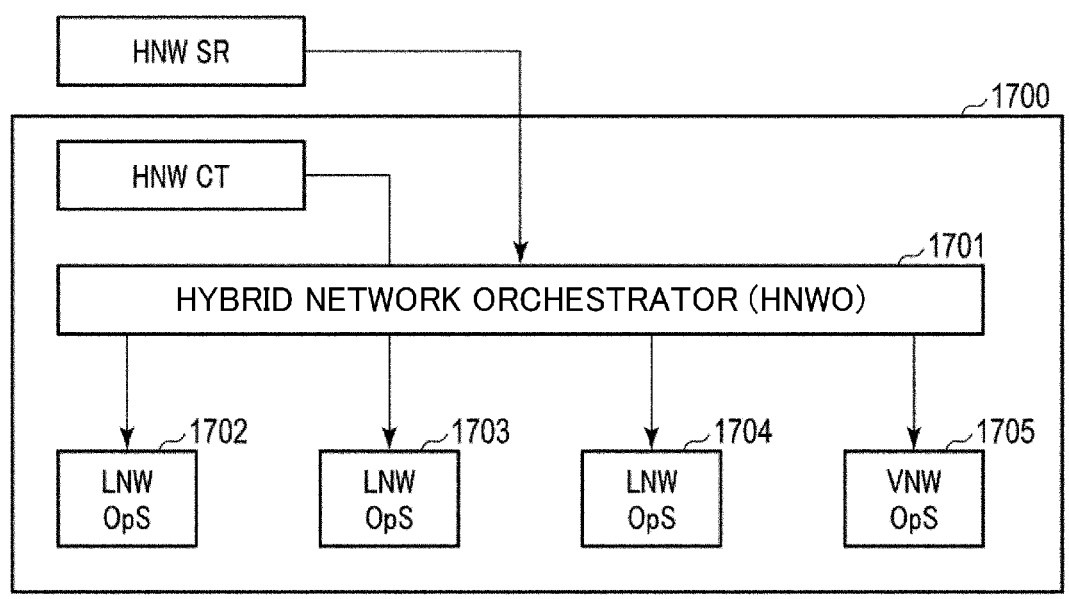
FIG. 17 is a block diagram illustrating an example of a service provision unit according to one embodiment.

FIG. 17 illustrates a schematic example of a service provision system that provides a service that uses the hybrid network in accordance with the integrated model according to one embodiment. The service provision system illustrated in FIG. 17 includes a hybrid network (not shown) and a service provision unit 1700. The service provision unit 1700 includes a hybrid network orchestrator 1701, legacy network operation support systems 1702, 1703, and 1704, and a virtual network operation support system 1705. The hybrid network orchestrator 1701 controls the legacy network operation support systems 1702, 1703, and 1704, and the virtual network operation support system 1705. The legacy network operation support systems 1702, 1703, and 1704 manage each legacy network included in the hybrid network. The virtual network operation support system 1705 manages a virtual network included in the hybrid network.

The hybrid network orchestrator 1701 has a catalog based on the integrated model. The catalog based on the integrated model includes a node type (FIG. 5) and a relationship type (FIG. 6) defined in TOSCA, and the above-mentioned two types of node types (FF Node and TP Node) and two types of relationship types (LNconnectsTo and LNCapability ProvidedBy). The catalog based on the integrated model is sometimes referred to as "hybrid network catalog" (HNW CT). The hybrid network catalog is provided so as to be able to be used by a user terminal (not shown).

The user terminal generates a service request in accordance with the catalog in order to request a service that uses the hybrid network. The service request generated in accordance with the catalog is sometimes referred to as "hybrid network service request" (HNW SR). The hybrid network service request from the user terminal is transmitted to the hybrid network orchestrator 1701.

The hybrid network orchestrator 1701 receives a hybrid network service request from the user terminal. The hybrid network orchestrator 1701 controls the legacy network operation support systems 1702, 1703, and 1704 and the virtual network operation support system 1705 based on the received hybrid network service request.

Figure 18:
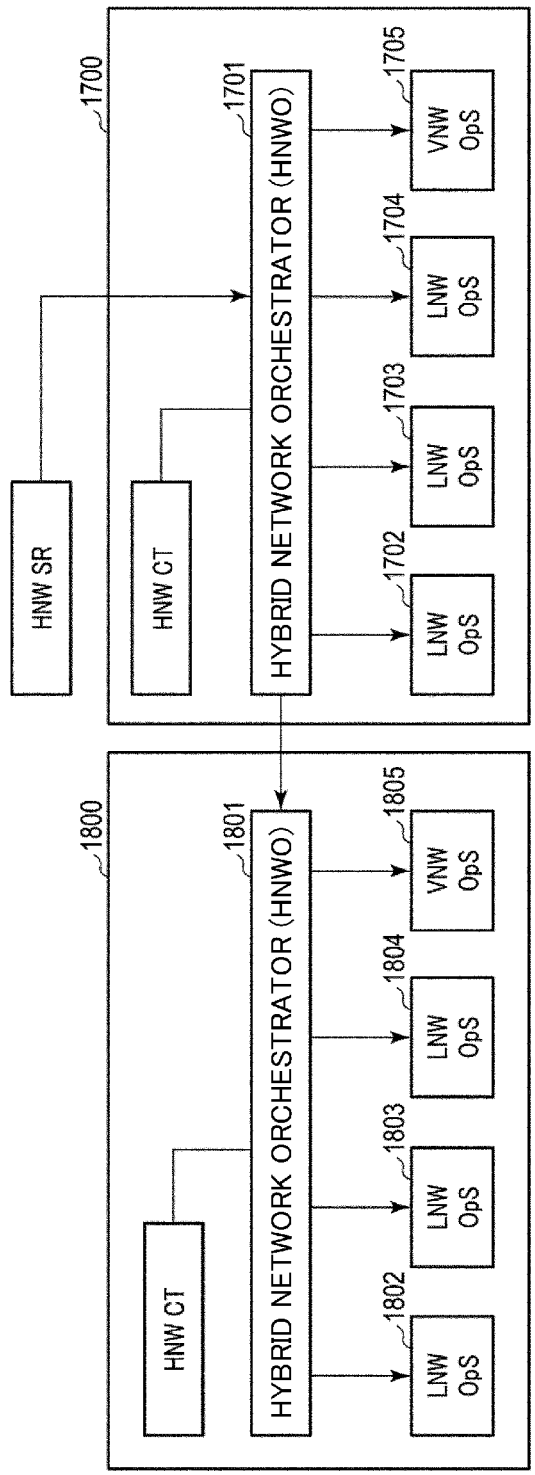
FIG. 18 is a block diagram illustrating an example of the service provision unit according to one embodiment.

FIG. 18 illustrates a schematic example of a service provision unit 1800 included in a service provision system that provides a service that uses the hybrid network in accordance with the integrated model, and that is provided across a plurality of communication carriers. In FIG. 18, the same component as that illustrated in FIG. 17 is assigned with the same reference symbol, and description thereof is omitted here.

As illustrated in FIG. 18, the service provision unit 1800 includes the hybrid network orchestrators 1701 and 1801, the legacy network operation support systems 1702, 1703, 1704, 1802, 1803, and 1804, and the virtual network operation support systems 1705 and 1805. The hybrid network orchestrator 1701, the legacy network operation support systems 1702, 1703, and 1704, and the virtual network operation support system 1705 are operated by the first communication carrier, and the hybrid network orchestrator 1801, the legacy network operation support systems 1802, 1803, and 1804, and the virtual network operation support system 1805 are operated by the second communication carrier.

When the hybrid network orchestrator 1701 has received a hybrid network service request from the user terminal, the hybrid network orchestrator 1701 determines whether there is a necessity for providing a service in cooperation with the second communication carrier. When the hybrid network orchestrator 1701 has determined that there is a necessity for providing a service in cooperation with the second communication carrier, the hybrid network orchestrator 1701 transmits a hybrid network service request to the hybrid network orchestrator 1801. The hybrid network orchestrator 1801 controls the legacy network operation support systems 1802, 1803, and 1804, and the virtual network operation support system 1805 based on the hybrid network service request received from the hybrid network orchestrator 1701.

Figure 19:
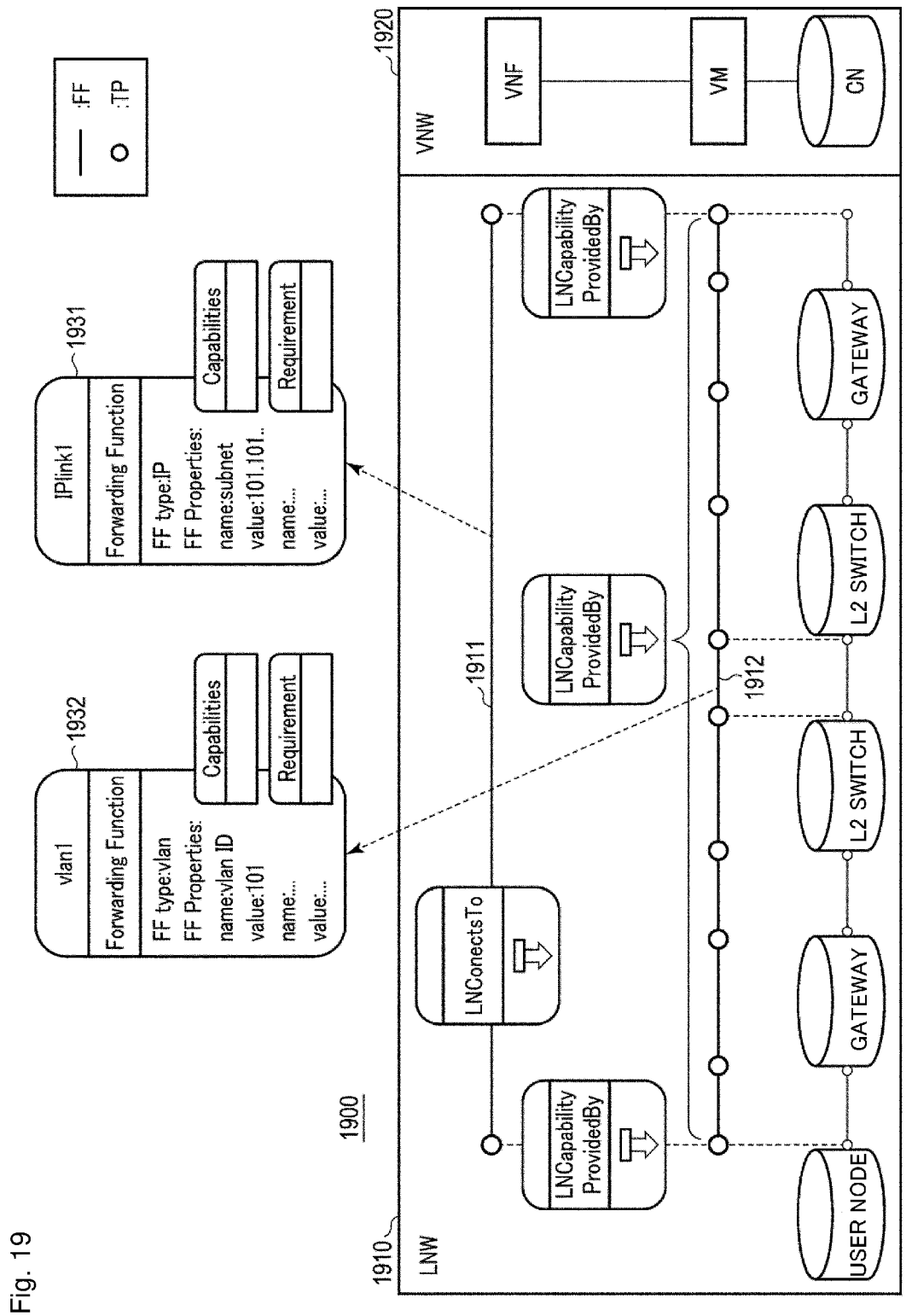
FIG. 19 is a diagram illustrating an example of representing the legacy network by an integrated model according to one embodiment.

FIG. 19 illustrates a schematic example of representing a hybrid network 1900 by the integrated model. As illustrated in FIG. 19, the hybrid network 1900 includes a legacy network 1910 and a virtual network 1920. In the legacy network 1910, a forwarding function node 1911 of the IP layer is represented by a Node Template 1931, and a forwarding function node 1912 of the VLAN layer is represented by a Node Template 1932. With the integrated model, it is possible to represent nodes in the legacy network 1910 and a vertical and horizontal relationship while at the same time representing the virtual network 1920.

Figure 20:
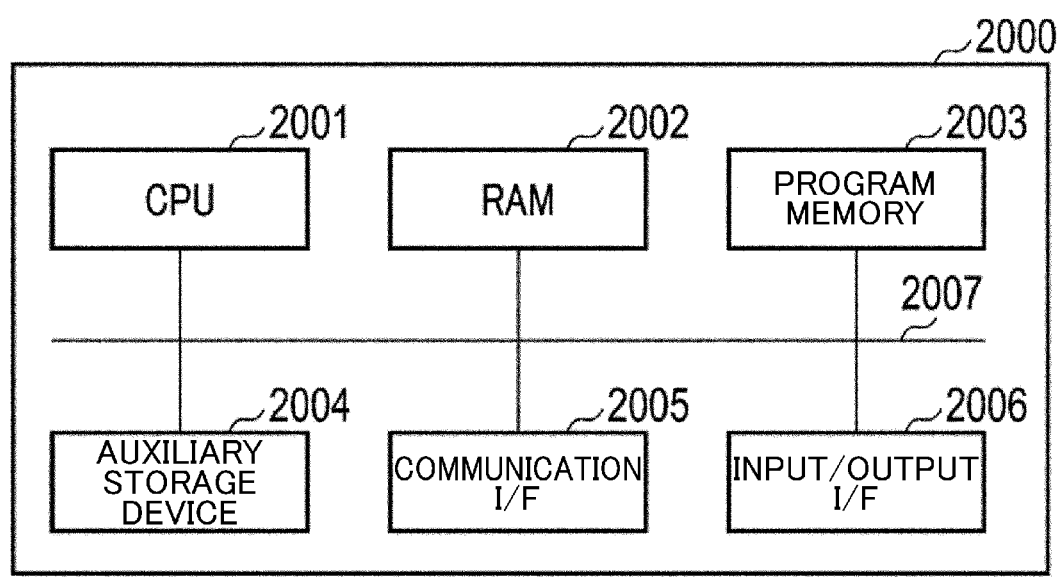
FIG. 20 is a block diagram illustrating an example of a computer according to one embodiment.

FIG. 20 illustrates a schematic example of a computer 2000 according to one embodiment. The computer 2000 illustrated in FIG. 20 may be a computer in which any one of the virtual network operation support system 103, the legacy network operation support system 105, and the hybrid network orchestrator 106 illustrated in FIG. 1 is implemented.

Referring to FIG. 20, the computer 2000 includes a CPU 2001, a random access memory (RAM) 2002, a program memory 2003, an auxiliary storage device 2004, a communication interface 2005, an input/output interface 2006, and a bus 2007. The CPU 2001 communicates with the RAM 2002, the program memory 2003, the auxiliary storage device 2004, the communication interface 2005, and the input/output interface 2006 via the bus 2007.

The CPU 2001 is an example of a general-purpose hardware processor. The RAM 2002 is used by the CPU 2001 as a working memory. The RAM 2002 includes a volatile memory such as a synchronous dynamic random access memory (SDRAM). The program memory 2003 stores various kinds of programs. Apart or a combination of a read-only memory (ROM) and an auxiliary storage device 2004 is used as the program memory 2003, for example. The auxiliary storage device 2004 stores data permanently. The auxiliary storage device 2004 includes a non-volatile memory such as a hard disk drive (HDD) or a solid state drive (SSD).

The communication interface 2005 is an interface for communicating with an external communication device. The communication interface 2005 includes a wired local area network (LAN) terminal, for example, and is connected to a communication network that may include the Internet by a LAN cable. The input/output interface 2006 includes a plurality of terminals for connecting to an input device and an output device. An example of the input device includes a keyboard, a mouse, and a microphone. An example of the output device includes a display device and a speaker.

Each program stored in the program memory 2003 includes a computer executable command. When the program (computer executable command) is executed by the CPU 2001, the program causes the CPU 2001 to execute predetermined processing. For example, when the CPU 2001 executes a hybrid network orchestrator program, the CPU 2001 executes a series of processing described above for the hybrid network orchestrator 106.

The program may be provided to the computer 2000 under a state in which the program is stored in a computer-readable storage medium. In this case, for example, the computer 2000 further includes a drive (not shown) that reads data from the storage medium, and acquires a program from the storage medium. An example of the storage medium includes a magnetic disk, an optical disc (e.g., CD-ROM, CD-R, DVD-ROM, or DVD-R), a magneto-optical disk (e.g., MO), and a semiconductor memory. Furthermore, a program may be stored in a server on the communication network, and the computer 2000 may download the program from the server by using the communication interface 2005.

The processing described above for the embodiment is not limited to execution of a program by a general-purpose processor such as a CPU, and may be executed by a dedicated processor such as an Application Specific Integrated Circuit (ASIC). A processing circuitry described herein may include at least one general-purpose hardware processor, at least one dedicated hardware processor, or at least one general-purpose hardware processor and at least one dedicated hardware processor. In the example illustrated in FIG. 20, the CPU 2001, the RAM 2002, and the program memory 2003 correspond to the processing circuitry.

[Operation]

Next, description is given of an example of operation of the service provision system according to an embodiment.

Figure 21:
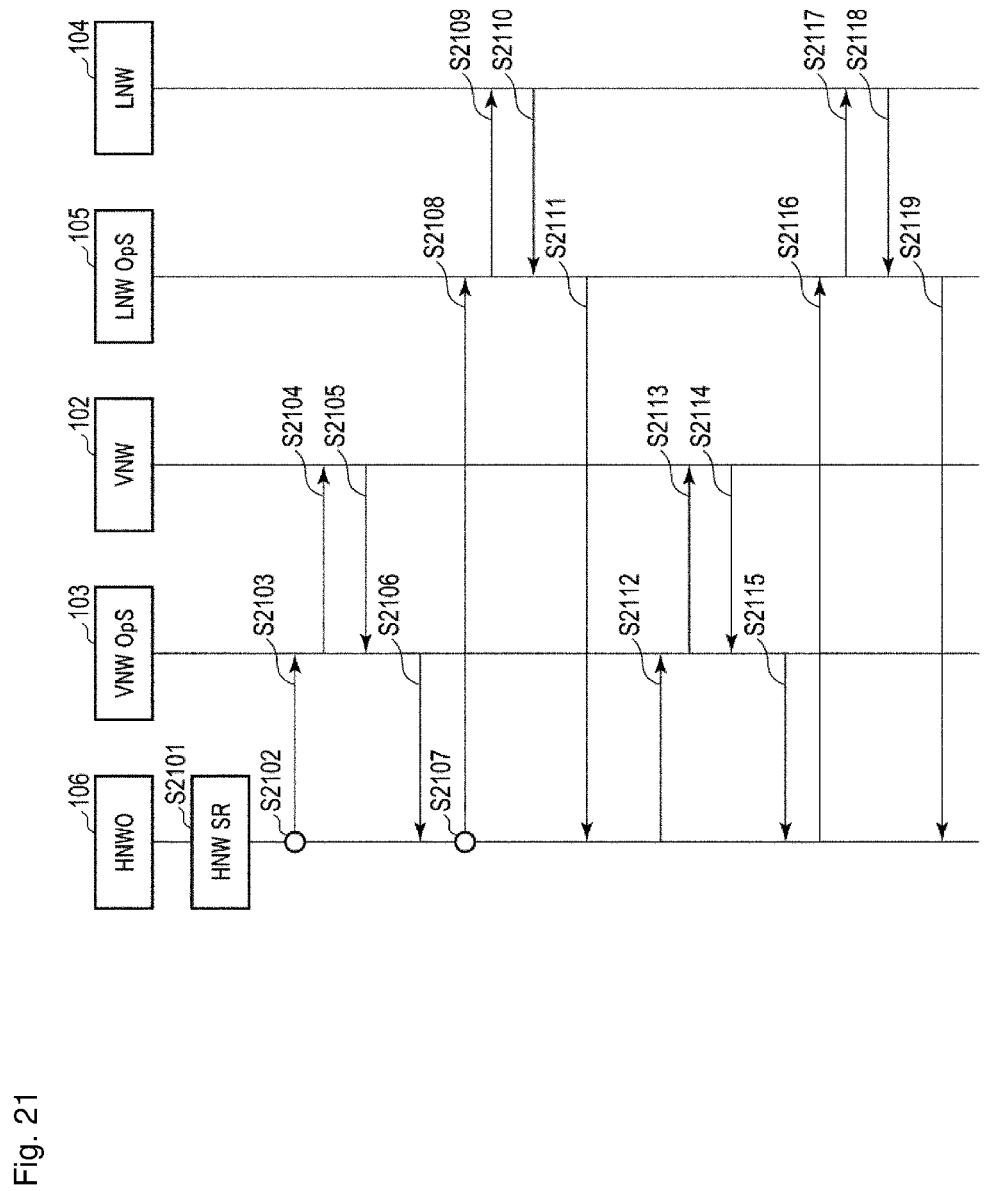
FIG. 21 is a flow chart illustrating an example of a series of processing of providing a service that uses the hybrid network according to one embodiment.

Now, description is given of an example of operation of the service provision system 100 illustrated in FIG. 1 with reference to FIG. 21. As described above, the service provision system 100 includes the virtual network 102, the virtual network operation support system 103, the legacy network 104, the legacy network operation support system 105, and the hybrid network orchestrator 106.

In Step S2101 of FIG. 21, the hybrid network orchestrator 106 receives, from the user terminal, a service request requesting a service that uses the hybrid network. The service request is generated on the user terminal in accordance with the service catalog based on the integrated model.

In Step S2102, the hybrid network orchestrator 106 determines whether the service request includes a Node Type relating to the virtual network 102. When the service request includes a Node Type relating to the virtual network 102, the processing proceeds to Step S2103, whereas when the service request does not include a Node Type relating to the virtual network 102, the processing proceeds to Step S2107.

When the service request includes a Node Type relating to the virtual network 102, the hybrid network orchestrator 106 communicates with the virtual network operation support system 103 in order to set the virtual network 102 in response to the service request. For example, in Step S2103, the hybrid network orchestrator 106 transmits an instruction that depends on the service request to the virtual network operation support system 103. In Step S2104, the virtual network operation support system 103 receives an instruction from the hybrid network orchestrator 106, and constructs a node and a link in accordance with the received instruction. When preparation of the virtual network 102 is complete (Step S2105), in Step S2106, the virtual network operation support system 103 notifies the hybrid network orchestrator 106 of the fact that preparation of the virtual network 102 is complete.

In Step S2107, the hybrid network orchestrator 106 determines whether the service request includes a Node Type relating to the legacy network 104. When the service request includes a Node Type relating to the legacy network 104, the processing proceeds to Step S2108, whereas when the service request does not include a Node Type relating to the legacy network 104, the processing proceeds to Step S2112.

When the service request includes a Node Type relating to the legacy network 104, the hybrid network orchestrator 106 communicates with the legacy network operation support system 105 in order to set the legacy network 104 in response to the service request. For example, in Step S2108, the hybrid network orchestrator 106 transmits an instruction that depends on the service request to the legacy network operation support system 105. In Step S2109, the legacy network operation support system 105 receives an instruction from the hybrid network orchestrator 106, and constructs a node and link in accordance with the received instruction. When preparation of the legacy network 104 is complete (Step S2110), in Step S2111, the legacy network operation support system 105 notifies the hybrid network orchestrator 106 of the fact that preparation of the legacy network 104 is complete.

With the above-mentioned processing of from Step S2102 to Step S2111, preparation for starting the service is complete.

In Step S2112, the hybrid network orchestrator 106 instructs the virtual network operation support system. 103 to start the service. In Step S2113, the virtual network operation support system 103 starts a node and a link constructed in the virtual network 102. When the node and link constructed in the virtual network 102 are activated (Step S2114), in Step S2115, the virtual network operation support system 103 notifies the hybrid network orchestrator 106 of the fact that the node and link constructed in the virtual network 102 are activated.

In Step S2116, the hybrid network orchestrator 106 instructs the legacy network operation support system 105 to start the service. In Step S2117, the legacy network operation support system 105 starts a node and link constructed in the legacy network 104. When the node and link constructed in the legacy network 104 are activated (Step S2118), in Step S2119, the legacy network operation support system 105 notifies the hybrid network orchestrator 106 of the fact that the node and link constructed in the legacy network 104 are activated.

After the processing of Step S2119, the user terminal can use the service.

Figure 22:
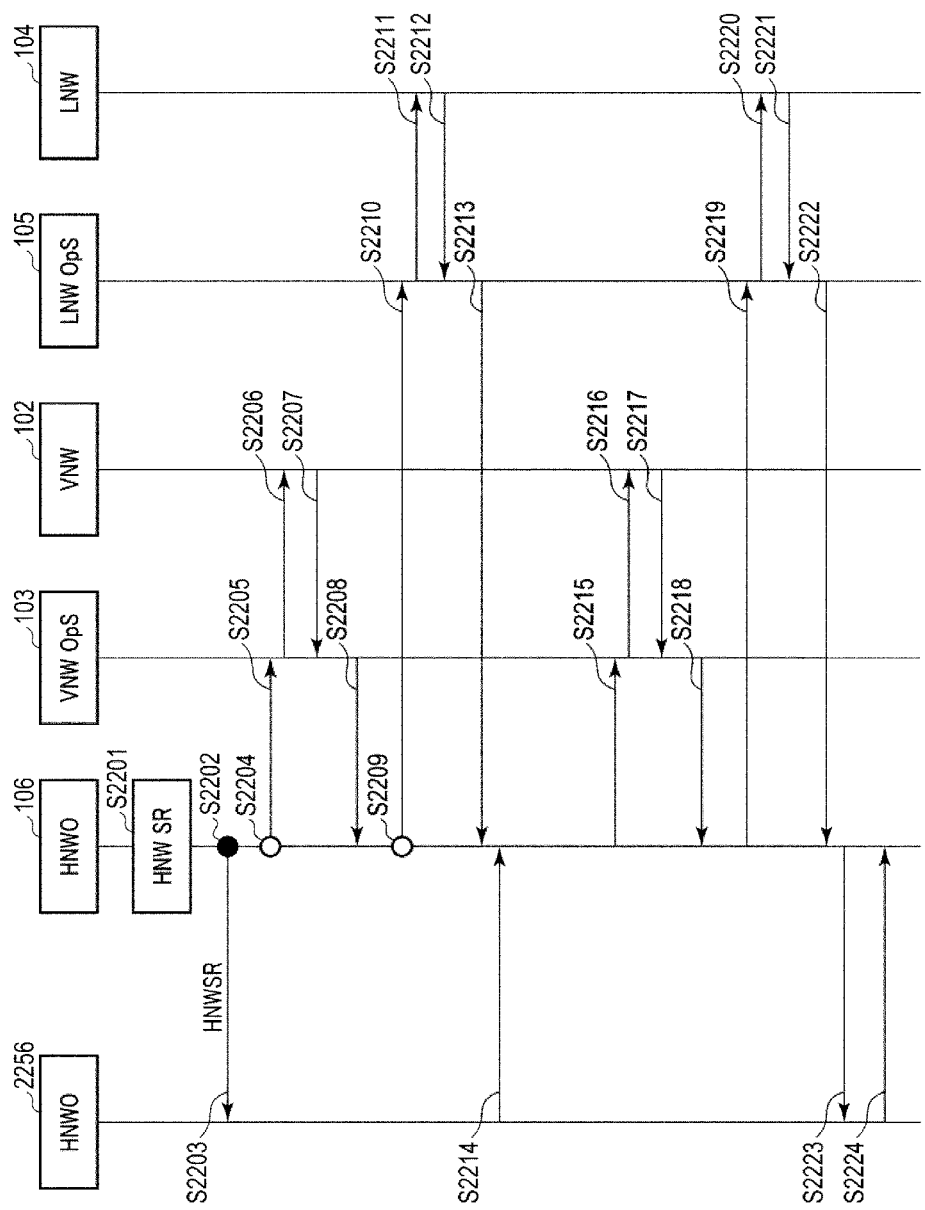
FIG. 22 is a flow chart illustrating an example of a series of processing of providing a service that uses the hybrid network according to one embodiment.

FIG. 22 illustrates an example of operation of the service provision system that provides a service that uses the hybrid network by a plurality of communication carriers. This service provision system includes the virtual network 102, the virtual network operation support system 103, the legacy network 104, the legacy network operation support system 105, and the hybrid network orchestrator 106, which are operated by the first communication carrier, and a virtual network, a virtual network operation support system, a legacy network, a legacy network operation support system, and a hybrid network orchestrator 2256, which are operated by the second communication carrier. In FIG. 22, the virtual network, the virtual network operation support system, the legacy network, and the legacy network operation support system, which are operated by the second communication carrier, are omitted.

The processing of Step S2211, Step S2214 to Step S2213, and Step S2215 to Step S2222 illustrated in FIG. 22 is similar to the processing of from Step S2101 to Step S2119 illustrated in FIG. 21, respectively, and thus description thereof is omitted here.

In Step S2212, the hybrid network orchestrator 106 determines whether to cooperate with the second communication carrier in response to the service request received from the user terminal in Step S2211. When the hybrid network orchestrator 106 has determined not to cooperate with another communication carrier, the same processing as that described above with reference to FIG. 21 is executed.

When the hybrid network orchestrator 106 has determined to cooperate with the second communication carrier, the hybrid network orchestrator 106 transmits a service request to the hybrid network orchestrator 2256. When the hybrid network orchestrator 2256 has received the service request from the hybrid network orchestrator 106, the hybrid network orchestrator 2256 executes processing similar to the processing of from Step S2102 to Step S2111 described above with reference to FIG. 21. Next, in Step S2214, the hybrid network orchestrator 2256 notifies the hybrid network orchestrator 106 of the fact that preparation for starting the service is complete.

In Step S2223, the hybrid network orchestrator 106 instructs the hybrid network orchestrator 2256 to start the service. When the hybrid network orchestrator 2256 has received the instruction from the hybrid network orchestrator 106, the hybrid network orchestrator 2256 executes processing similar to the above-mentioned processing of from Step S2112 to Step S2119 described above with reference to FIG. 21. Next, in Step S2224, the hybrid network orchestrator 2256 notifies the hybrid network orchestrator 106 of the fact that the node and link constructed in the hybrid network are activated.

After the processing of Step S2224, the user terminal can use the service.

[Effect]

As described above, the hybrid network orchestrator provides a catalog including four types described below, receives a service request generated in accordance with the catalog from a user terminal, and controls a virtual network operation support system and a legacy network operation support system based on the received service request. The four types refer to a node type for defining a node relating to a virtual network, a relationship type for defining a relationship between nodes relating to the virtual network, a node type for defining a node relating to the legacy network, and a relationship type for defining a relationship between nodes relating to the legacy network. With this configuration, a catalog can be created in an integrated manner, a service request can be created in an integrated manner at the time of application of the service, and the service request can be processed in an integrated manner. As a result, the number of catalogs to be referred to at the time of application of the service is reduced, and the number of service requests to be generated at the time of application of the service is reduced. As a result, it is easy to apply for the service. Furthermore, the hybrid network orchestrator can control the service operation system in an integrated manner. As a result, an adaptor between service operation systems is not required, and it is easy to implement the hybrid network. Furthermore, development of a system required for implementation of the hybrid network is reduced.

A model obtained by adding the following node type and relationship type to TOSCA serving as a known model applicable to a virtual network is defined as an integrated model. The node type for defining a node relating to the legacy network includes a node type for defining a forwarding function node relating to the legacy network and a node type for defining a termination point node relating to the legacy network. Thus, it is possible to represent a node relating to the legacy network by any one of the two types of node types. The relationship type for defining a relationship between nodes relating to the legacy network includes a relationship type for defining an intra-layer relationship between nodes relating to the legacy network and a relationship type for defining an inter-layer relationship between nodes relating to the legacy network. Thus, it is possible to represent a relationship between nodes relating to the legacy network by any one of the two types of relationship types. As a result, it is possible to easily create a catalog based on the integrated model, and to perform operation of creating a service request.

The node type for defining a node relating to the legacy network and the node type for defining a termination point node relating to the legacy network are designed so as to be capable of being applied to a plurality of legacy networks included in the hybrid network. As a result, an adaptor between operation supports systems of the legacy networks is not required, and it is easy to implement the system.

The present invention is not limited to the above-mentioned embodiments, and can be modified in various forms within a scope that does not depart from the gist at the stage of implementation. Furthermore, the embodiments may be appropriately combined to the extent possible for implementation, and a combined effect is obtained in that case. Furthermore, the above-mentioned embodiments include inventions at various stages, and various inventions may be extracted through appropriate combination of a plurality of disclosed elements.

[Supplementary Note]

A part or all of the above-mentioned embodiments may be described in the following supplementary notes, but are not limited to the following supplementary notes.

<Supplementary Note 1>

A service provision method to be executed by a computer, the service provision method including: a process of providing a catalog including: a first node type for defining a node relating to a virtual network; a first relationship type for defining a relationship between nodes relating to the virtual network; a second node type for defining a node relating to a legacy network; and a second relationship type for defining a relationship between nodes relating to the legacy network; a process of receiving, from a user terminal, a service request generated in accordance with the catalog for requesting a service that uses a hybrid network including the virtual network and the legacy network; and a process of controlling a virtual network operation support system that manages the virtual network and a legacy network operation support system that manages the legacy network in response to the received service request.

<Supplementary Note 2>

A service provision device, including: means for providing a catalog including: a first node type for defining a node relating to a virtual network; a first relationship type for defining a relationship between nodes relating to the virtual network; a second node type for defining a node relating to a legacy network; and a second relationship type for defining a relationship between nodes relating to the legacy network; means for receiving, from a user terminal, a service request generated in accordance with the catalog for requesting a service that uses a hybrid network including the virtual network and the legacy network; and means for controlling a virtual network operation support system that manages the virtual network and a legacy network operation support system that manages the legacy network in response to the received service request.

<Supplementary Note 3>

A computer program for causing a computer to function as: means for providing a catalog including: a first node type for defining a node relating to a virtual network; a first relationship type for defining a relationship between nodes relating to the virtual network; a second node type for defining a node relating to a legacy network; and a second relationship type for defining a relationship between nodes relating to the legacy network; means for receiving, from a user terminal, a service request generated in accordance with the catalog for requesting a service that uses a hybrid network including the virtual network and the legacy network; and means for controlling a virtual network operation support system that manages the virtual network and a legacy network operation support system that manages the legacy network in response to the received service request.

REFERENCE SIGNS LIST

100 Service provision system
101 Hybrid network
102 Virtual network
103 Virtual network operation support system
104 Legacy network
105 Legacy network operation support system
106 Hybrid network orchestrator
107 User terminal
110 Service provision unit
200 Service provision unit
201 to 203, 301 to 303 Legacy network operation support system
204, 304 Virtual network operation support system
205 to 208, 305 to 308, 311 to 314 Adaptor
1100, 1900 Hybrid network
1110, 1910 Legacy network
1111 to 1113 Node
1120, 1920 Virtual network
1121 Virtual network function
1122 Virtual machine
1123 Computer node
1700, 1800 Service provision unit
1701, 1801 Hybrid network orchestrator
1702 to 1704, 1802 to 1804 Legacy network operation support system
1705, 1805 Virtual network operation support system
2000 Computer
2001 CPU
2002 RAM
2003 Program memory
2004 Auxiliary storage device
2005 Communication interface
2006 Input/output interface
2007 Bus
2256 Hybrid network orchestrator

The invention claimed is:

1. A service provision method, comprising:
providing, by one or more computers, a service catalog including:
a first node type for defining a node relating to a virtual network;
a first relationship type for defining a relationship between nodes relating to the virtual network;
a second node type for defining a node relating to a legacy network; and
a second relationship type for defining a relationship between nodes relating to the legacy network;
receiving, by one or more computers and from a user terminal, a service request generated in accordance with the service catalog for requesting a service from the service catalog that uses a hybrid network including the virtual network and the legacy network; and
controlling, by one or more computers, a virtual network operation support system that manages the virtual network and a plurality of interconnected legacy network operation support systems that manage the legacy network in response to receiving the service request,
wherein each of the plurality of interconnected legacy network operation support systems and the virtual network operation support system comprises the service catalog.

2. The service provision method according to claim 1, wherein the second node type includes a node type for defining a link or a device having a forwarding function relating to the legacy network and a node type for defining a termination point of a port or a link relating to the legacy network.

3. The service provision method according to claim 1, wherein the second relationship type includes a relationship type for defining an intra-layer relationship between nodes relating to the legacy network and a relationship type for defining an inter-layer relationship between nodes relating to the legacy network.

4. The service provision method according to claim 1, wherein the first node type and the first relationship type are a node type and a relationship type which are defined in Topology and Orchestration Specification for Cloud Applications (TOSCA).

5. The service provision method according to claim 1, wherein the hybrid network includes a plurality of legacy networks, and the second node type and the second relationship type are designed so as to be capable of being applied to the plurality of legacy networks.

6. A service provision device comprising a processing circuit configured to:
provide a service catalog including:
a first node type for defining a node relating to a virtual network;
a first relationship type for defining a relationship between nodes relating to the virtual network;
a second node type for defining a node relating to a legacy network; and
a second relationship type for defining a relationship between nodes relating to the legacy network;
receive, from a user terminal, a service request generated in accordance with the service catalog for requesting a service from the service catalog that uses a hybrid network including the virtual network and the legacy network; and
control a virtual network operation support system that manages the virtual network and a plurality of interconnected legacy network operation support systems that manage the legacy network in response to receiving the service request,
wherein each of the plurality of interconnected legacy network operation support systems and the virtual network operation support system comprises the service catalog.

7. The service provision device according to claim 6, wherein the second node type includes a node type for defining a link or a device having a forwarding function relating to the legacy network and a node type for defining a termination point of a port or a link relating to the legacy network, and the second relationship type includes a relationship type for defining an intra-layer relationship between nodes relating to the legacy network and a relationship type for defining an inter-layer relationship between nodes relating to the legacy network.

8. A non-transitory computer-readable medium having stored thereon a command to cause, when the command is executed by a hardware processor, the hardware processor to execute a method, the method comprising:
providing a service catalog including:
a first node type for defining a node relating to a virtual network;
a first relationship type for defining a relationship between nodes relating to the virtual network;
a second node type for defining a node relating to a legacy network; and
a second relationship type for defining a relationship between nodes relating to the legacy network;
receiving, from a user terminal, a service request generated in accordance with the service catalog for requesting a service from the service catalog that uses a hybrid network including the virtual network and the legacy network; and
controlling a virtual network operation support system that manages the virtual network and a plurality of interconnected legacy network operation support systems that manage the legacy network in response to receiving the service request,
wherein each of the plurality of interconnected legacy network operation support systems and the virtual network operation support system comprises the service catalog.

* * * * *